United States Patent
Anagurti et al.

(10) Patent No.: US 12,216,627 B2
(45) Date of Patent: Feb. 4, 2025

(54) SYSTEMS AND METHODS FOR PROVIDING A DATABASE DRIVER MANAGEMENT ARCHITECTURE

(71) Applicant: JPMORGAN CHASE BANK, N.A., New York, NY (US)

(72) Inventors: Karthik Anagurti, Hyderabad (IN); Kamal Pande, Dehradun (IN); Kiran Kumar Macherla, Visakhapatnam (IN); Kajal Gorai, Lewis Center, OH (US); Scott R Stevens, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/446,144

(22) Filed: Aug. 8, 2023

(65) Prior Publication Data

US 2024/0427748 A1   Dec. 26, 2024

(30) Foreign Application Priority Data

Jun. 23, 2023   (IN) .............................. 202311041978

(51) Int. Cl.
    *G06F 16/21*   (2019.01)
(52) U.S. Cl.
    CPC ................................. *G06F 16/217* (2019.01)
(58) Field of Classification Search
    CPC .................................................... G06F 16/217
    USPC ......................................................... 707/804
    See application file for complete search history.

(56) References Cited

U.S. PATENT DOCUMENTS

| | | | |
|---|---|---|---|
| 6,189,051 B1* | 2/2001 | Oh | G06F 8/64 709/219 |
| 11,995,052 B1* | 5/2024 | Wang | G06Q 10/1053 |
| 2004/0153830 A1* | 8/2004 | Cebula | G06F 11/3688 714/38.14 |
| 2013/0138718 A1* | 5/2013 | Mallur | G06F 8/60 709/220 |
| 2022/0284032 A1* | 9/2022 | Rao Krishnagi | G06F 16/9566 |
| 2023/0110698 A1* | 4/2023 | Yarovoy | G06F 16/955 713/1 |

* cited by examiner

*Primary Examiner* — Sheree N Brown
(74) *Attorney, Agent, or Firm* — GREENBERG TRAURIG LLP

(57) ABSTRACT

In some aspects, the techniques described herein relate to a method including: receiving, at a client computer, a driver script file; creating, by the driver script file, a use-case specific directory; creating, by the driver script file, an application parameters file; retrieving, by the driver script file, a core configuration script file; determining, by the core configuration script file, a required database driver; retrieving, by the core configuration script file, the required database driver; retrieving, by the core configuration script file, a database driver configuration file for the required database driver; populating, by the core configuration script file, the database driver configuration file with a plurality of entries, wherein the plurality of entries in the database driver configuration file comprise entries based on a user input; and validating, by the core configuration script file, a connection defined by the database driver configuration file.

20 Claims, 3 Drawing Sheets

SYSTEMS AND METHODS FOR PROVIDING A DATABASE DRIVER MANAGEMENT ARCHITECTURE

RELATED APPLICATIONS

This application claims the benefit of Indian patent application No. 202311041978, filed Jun. 23, 2023. The disclosure of this application is hereby incorporated, by reference, in its entirety.

BACKGROUND

1. Field of the Invention

Aspects generally relate to systems and methods for providing a database driver management architecture.

2. Description of the Related Art

Inquiries into usage of technical support resources have shown that a significant number of resources are used providing database driver and connection installation and configuration. Automating such support, however, is technologically complex due to the number of paths, variables, files, entries, etc., and to the number of database platforms that may be available to an end user.

SUMMARY

In some aspects, the techniques described herein relate to a method including: executing, on a client computer, a core configuration script file; determining, by the core configuration script file, a required database driver; retrieving, by the core configuration script file, the required database driver; retrieving, by the core configuration script file, a database driver configuration file for the required database driver; populating, by the core configuration script file, the database driver configuration file with a plurality of entries, wherein the plurality of entries in the database driver configuration file includes entries based on a user input; and validating, by the core configuration script file, a connection defined by the database driver configuration file, wherein validating the connection includes connecting to a selected database using the required database driver and a database-specific standard query.

In some aspects, the techniques described herein relate to a method, wherein the user input includes the selected database, and a selected client application to connect to the selected database with.

In some aspects, the techniques described herein relate to a method, including: creating, by the core configuration script file, a database-specific file.

In some aspects, the techniques described herein relate to a method, wherein validating the connection includes creating a connection string based on the plurality of entries in the database driver configuration file.

In some aspects, the techniques described herein relate to a method, including: determining, by the core configuration script file, that the connection is not operative; and raising, by the core configuration script file, a support with a technical support platform.

In some aspects, the techniques described herein relate to a method, including: receiving, at the client computer, a driver script file; and executing the driver script file.

In some aspects, the techniques described herein relate to a method, including: creating, by the driver script file, a use-case specific directory.

In some aspects, the techniques described herein relate to a method, including: creating, by the driver script file, an application parameters file.

In some aspects, the techniques described herein relate to a method, including: retrieving, by the driver script file, the core configuration script file from an artifact repository.

In some aspects, the techniques described herein relate to a method, including: creating, by the driver script file, a base project directory.

In some aspects, the techniques described herein relate to a method, including: creating, by the driver script file, an application-parameters file.

DETAILED DESCRIPTION

Figure 1:
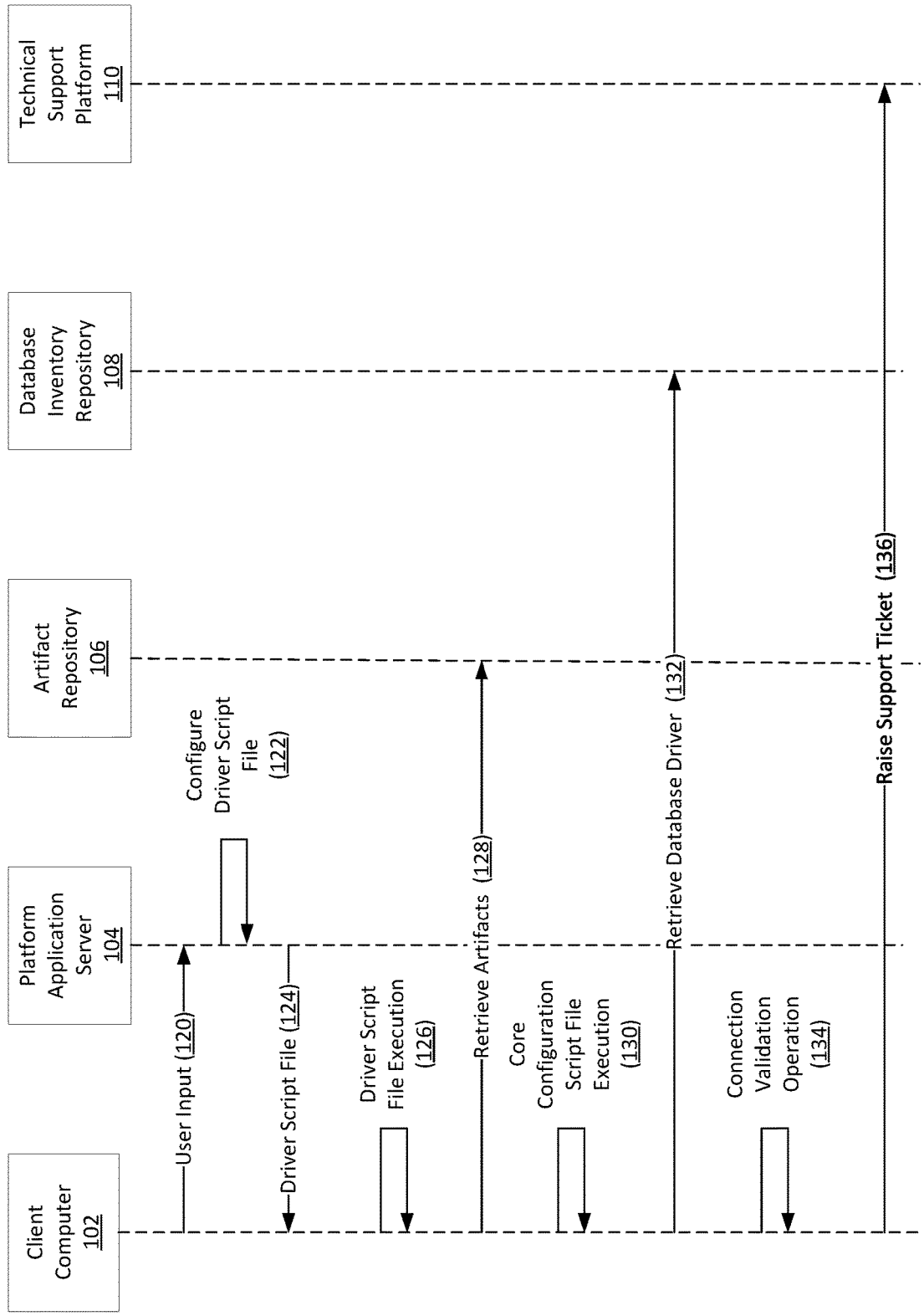
FIG. 1 is a sequence diagram for providing database driver management, in accordance with aspects.

Aspects generally relate to systems and methods for providing a database driver management architecture.

In accordance with aspects, a database driver management architecture may scan a client computer for an approved and compatible driver based on needed connectivity, raise an automated request for installation through an API based framework, configure database drivers in an automated manner on the client computer including configuring a data source name (DSN) and necessary environment variables, validate connectivity to the appropriate database, and raise a ticket to a support team if any issues are encountered.

In accordance with aspects, a user of a client machine may interact with a database driver management platform (referred to herein as a "platform") via an interface provided by the platform. An interface may be, e.g., a graphical user interface, command line interface, etc. The platform interface may receive input from the user and provide the input to the platform. A platform interface may provide a list of an organization's databases that a client computer may connect to. A platform interface may allow a user of a client computer to select one or more of the databases from a list of databases and prompt driver configuration and installation of the appropriate database driver.

A user may select, from a platform interface, a database to connect to, a client application which the user wishes to connect to the selected database, and a version of the selected client application, if multiple versions are supported. As used herein, a client application may be any computer application that may be configured to connect to a database using a database driver (e.g., any desktop application, web-based application, mobile application, etc.). A selected client application may rely on one or many database drivers through which connectivity to a respective database is established A platform may receive the database selection, the client application selection, and a version of the client application (if selected) as input via the interface and use the input to generate an executable driver script in, e.g., a script file format. An executable driver script file may be in the form of, e.g., a .bat (batch) file or some other executable script file format. Script files may include commands that an interpreter accepts and may combine logical constructs such as conditional branching, loops, etc., carried out during execution of the commands. Exemplary aspects of a driver script file may include the noted user inputs (e.g., client application name, client application version, database name, etc.), a reference to a latest version of a core configuration script, a project structure to be used, and script commands that reference a location of a core configuration script file in an artifact repository and facilitate a connection to the artifact repository for downloading the core configuration script and invoking it without further user input (i.e., automatically).

A platform application service may generate a driver script file upon receipt of user inputs. Driver script file generation may begin by segregating user inputs and creating a key-value pair data structure within the driver script file. The key-value pair data structure may assign a key to each value received as user input. For instance, a client application name may be assigned a first key, a client application version may be assigned a second key, and a database name may be assigned a third key. Assigned keys may be used as variables in script commands. Other data may be included in the key-value pair and may be assigned a key as necessary or desired.

In accordance with aspects, a platform may provide, as output to a client computer, a driver script file as a download to the client computer. The requesting user may then execute the script file (e.g., by "double-clicking" the file, providing an appropriate command, etc.) in order to begin the driver configuration and installation operation. A driver script file may first execute a command that determines if a base project directory is present. The base project directory is a directory on the client computer to where the driver script file will store needed artifacts for database driver configuration and execution. The base project directory is a location from which further operation input/output (I/O) may occur. The base project directory may be a temporary directory that database driver configuration and installation operations may use as a working directory during pendency of the operations.

A driver script file may further determine if a use-case specific directory exists. A use-case specific directory may be a directory where a database driver (e.g., a driver file or files) and some or all needed configuration files are stored on the client computer and from where the files are accessed by a connecting client application. In some aspects, the use-case specific directory may require a particular name so that applications using its contents may be reliably found. In other aspects, the use-case specific directory may have a variable name with the name recorded in a system or application configuration file or a system (e.g., an operating system) registry. In some aspects, the use-case specific directory may be a sub-directory of the base project directory.

A driver script file may further determine if an application-parameters file is present on the client computer. An application-parameters file is a file that may be generated on the client computer. In some aspects, the application-parameters file may be persisted to the use-case specific directory. An application-parameters file may include user inputs. For instance, included parameters may include {"client application": "ExemplaryApp123", "version": "2021.4", "database": "ExemplaryDB_engine"}.

If an application parameters file is not found on the client computer, the driver script file may create a new application parameters file in the project standard path. As used herein, a standard path refers to a directory path of the base project directory and the use-case specific directory. For instance, a standard path where a use-case specific directory is a sub directory of a base project directory may be H:/Base_Project/Case_Specific, where Base_Project specifies the base project directory and Case_Specific specifies the use-case specific directory. If an application-parameters file is present, or if the driver script file creates an application-parameters file, then the driver script file may update the application parameters file with latest user inputs for application I/O.

A driver script file may further determine whether a core configuration script file is present on the client computer. A core configuration script file is a script file that, when executed, configures a client computer to connect to a selected/specified database. If a core configuration script file is not present on the client computer, or if a core configuration script is found on the client computer but is determined to be an old or unacceptable version of the core configuration script file, then the driver script file may retrieve a latest or acceptable version of the core configuration script file from an artifact repository. An appropriate core configuration script file may be determined based on received user input, and a driver script file may retrieve a core configuration script file from an artifact repository, save the core configuration script file project on a client computer (e.g., in the standard path) and may execute (i.e., launch) the core configuration script file to begin configuration of the selected database driver.

In accordance with aspects, a driver script file may prompt execution of a core configuration script file that may begin validation and configuration of a database driver on the client computer. A core configuration script file may also utilize user input (e.g., input from an interface, as described above) in order to determine input-specific triggers and as variables in conditional logic included in the core configuration script file. Once launched, a core configuration script file may determine the user input and, based on the input, may determine a database driver and corresponding details. For instance, a core configuration script file may determine a type of driver and a driver version based on the user input. The core configuration script file may then retrieve the appropriate driver version from an artifact repository along with other driver-details such as a driver package, an organizational identifier (ID) of the particular driver, etc. A driver package may contain database-specific driver software that may be used/required to connect to the selected database from the client computer.

Based on the retrieved driver and driver details, a core configuration script file may launch a driver validation operation. A driver validation operation may communicate with an operating system on the client computer and may determine what database drivers are currently installed on the client computer. The core configuration script file may leverage available commands provided by an operating system (OS) of the client computer to determine a list of installed software and particular files that are specific to a particular (e.g., a selected) database. A driver validation operation may then parse properties of the installed drivers to determine if a valid version of the database driver requested by the user exists and is appropriately installed on the client computer. If the driver requested via the user input is found, and if the installation of the driver and the driver's version can be validated, then the core configuration script may end. If, however, the requested driver is not found on the client computer, if the installation is found to be corrupt or otherwise not in alignment with organizational standards, or if the driver is determined to be an unacceptable version, then the core configuration script file may begin a configuration and installation operation to install an appropriate version of the requested database driver.

In accordance with aspects, a configuration and installation operation may configure a client computer with required paths, files, and directories for the requested database, database driver, and connection. These configuration steps may vary for different databases and respective database drivers. The configuration and installation operation, however, may determine if database-specific client paths are present on the client computer and may extract and generate an appropriate client path for the requested or appropriate database driver version being installed.

A configuration and installation operation may further determine if required environment variables are present on the client computer. If required environment variables are not present, the configuration and installation operation may create and/or update the required environment variables. A configuration and installation operation may also determine if database-specific files (such as TNSNAMES.ora, or any other required files) exist on the client computer, and if such files are not found may create the required files.

When configuring database-specific client paths, a configuration and installation operation may query the recommended path for the requested database and corresponding driver from a repository (e.g., an artifact repository). A recommended path may be stored in a repository as a file that is associated with a particular version of a driver for a corresponding database. Once the recommended path is retrieved, the path may be created as an environment variable in an appropriate file or in a registry of/in, e.g., the operating system of the client computer. If the path is not in high priority (i.e., if the path is not in a topmost position in a containing file or not a topmost item in the list of paths present in a "PATH" environment variable), the path may be updated or added with high priority. A configuration and installation operation may then validate the database-specific client path to determine it is reachable.

A configuration and installation operation may also determine if database specific files are present and valid. For instance, if a required configuration file (such as a TNSNAMES.ora) is not present on the client computer, a configuration and installation operation may retrieve a fresh version of a configuration file from an artifact repository. A configuration and installation operation may validate configuration files to determine if the entries are valid and may replace invalid entries in a configuration file with valid entries. Exemplary entries in one or more configuration files include a trace directory path in, e.g., a SQLNET.ORA file (e.g., c: \users\<user-specific-folder>), A directory containing a Kerberos configuration file in SQLNET.ORA (e.g., h: \kerberos\krb5.conf), etc.

A configuration and installation operation may further determine if a directory exists at the recommended path for storing configuration files on a client computer. If a directory does not exist at the recommended path, the configuration and installation operation may create the directory for the configuration file. Recommended paths include paths to particularly named directories that a particular database and corresponding connection operations will look, by default, for required configuration files. In some aspects, a user may be prompted for a valid configuration file, and may provide a valid configuration file via a platform interface.

In an exemplary configuration and installation operation, a database driver may be installed and configured and may be ready for a connection validation operation. In accordance with aspects, a connection validation operation may validate if a connection made to a database via an installed or updated database driver configuration is operational (i.e., is communicatively coupled to a corresponding database). A connection validation operation may utilize a database name and/or hostname, a service name, and credentials (if required) in order to test a driver configuration. A connection validation operation may retrieve a database name, hostname, and a service name from the configuration files from previous steps. A connection validation operation may create an appropriate connection string using these variables and validate that a connection is operative.

A connection validation operation may retrieve a database-specific standard query with which to test the connection. A database-specific standard query may be a database query that is created for testing purposes and that is stored in a location from where a connection validation operation may retrieve it, e.g., in an artifact repository. A storage location may store a database-specific standard query for each different type of database that a connection validation operation may test, and each database-specific standard query may be formatted in the correct query language and with appropriate parameters such that, if the connection is operative, the query result will validate the operative status of the connection.

A connection validation operation may, if a tested connection is found to be operative, display a message indicating success to a user of the client computer. If, on the other hand, the connection is found to be inoperative, the connection validation operation may display a prompt to the user asking if the user would like a support ticket to be raised. If the user responds to the prompt in the negative, then the connection validation operation and the overarching configuration and installation operation may stop execution. If, however, the user responds in the affirmative to the prompt, then the connection validation operation may proceed to automate creation of a support ticket to an organization's technical support system.

In accordance with aspects, a connection validation operation may be configured to utilize an application programming interface (API) of a technical support application to raise a support ticket. The connection validation operation may utilize error details from an inoperative database connection attempt (e.g., that utilizes as database driver and configuration freshly installed by an associated configuration and installation operation) as input to an API method call to the technical support application. Other method parameters may include an error description, a client computer type and operating system type and version, a database driver version, etc. The method may create the support ticket and may submit the ticket to a queue or other ticket management process for evaluation by a support specialist.

FIG. 1 is a sequence diagram for providing database driver management, in accordance with aspects. FIG. 1 includes client computer 102, platform application server 104, artifact repository 106, database inventory repository 108, and technical support platform 110. The components of FIG. 1 may be included in a providing organization's technology infrastructure.

A providing organization's technology infrastructure may include servers, computers, software applications, computer network mediums, and computer networking hardware and software for providing electronic services based on computer software applications executing on requisite hardware. Exemplary hardware and software include webservers, application servers, database servers and database engines, communication servers such as email servers and SMS servers, network routers, switches and firewalls, custom-developed software applications (i.e., computer applications) including hardware to execute such applications on, etc.

Client computer 102 may be an electronic device such as a smart phone, a tablet computer, a laptop computer, a desktop computer, or any electronic device that may be configured with computer applications and that require database drivers in order to connect to a database (either a local or remote database). Platform application server 104, artifact repository 106, database inventory repository 108, and technical support platform 110 may be software services that execute on hardware servers. The software services and hardware servers may be configured for operative communications among each other. For instance, hardware servers may be communicatively coupled to a network infrastructure with appropriate hardware and software. For instance, client computer 102 and other computer hardware may include a wired or wireless network interface card (NIC) that interfaces with a computer network of the infrastructure and is configured with appropriate communication protocols. Client and server computers operating on the technology infrastructure may include hardware (NICs, switches, routers, etc.) configured with appropriate protocols for intercommunication with each other over the computer network.

In accordance with aspects, at step 120, user input may be sent from client computer 102 and received by platform application server 104. User input may be received at client computer 102 via an interface (such as a graphical user interface (GUI)). User input may include a database to connect to, a client application from which the user wishes to connect to the selected database, and a version of the selected client application if multiple versions are supported. The user input may be received at platform application server 104.

Upon receipt of the user input, platform application server 104 may configure a driver script file using the received user input at step 122. The driver script file may include the noted user inputs, a reference to a latest version of a core configuration script, a project structure to be used, and script commands or a second script file (referenced in (i.e., called from) the driver script file that facilitates a connection to an artifact repository for downloading the core configuration script and invoking it. Platform application server 104 may send the driver script file to client computer 102 at step 124.

At step 126, the driver script file may execute on client computer 102. Execution may include steps as discussed herein with respect to a driver script file. For instance, a driver script file may determine if a base project directory is present, determine if a use-case specific directory exists, determine if an application-parameters file is present on the client computer, update the application parameters file with latest user inputs for application I/O, determine whether a core executable file is present on the client computer, etc.

At step 128, the driver script file, executing on client computer 102, may retrieve needed artifacts determined by the driver script file from artifact repository 106. For instance, driver script file commands may retrieve a core configuration script, a database configuration file, and/or a database specific standard query from artifact repository 106. Retrieval of artifacts from artifact repository 106 may happen one or more times during execution of a driver script file, and each retrieval step may retrieve a different artifact.

At step 130, the driver script file may prompt execution of a core configuration script file on client computer 102. The core configuration script file may begin validation and configuration of a database driver on client computer 102. A core configuration script file may determine the user input and, based on the input, may determine a database driver and corresponding details. For instance, a core configuration script file may determine a type of driver and a driver version based on the user input. The core configuration script file may then, at step 132, retrieve the appropriate driver version from artifact repository 106 along with other driver-details such as a driver package, an organizational identifier (ID) of the particular driver, etc.

Step 130 may further include a driver validation operation. A driver validation operation may communicate with an operating system on client computer 102 and may determine what database drivers are currently installed on client computer 102. A driver validation operation may then parse the installed drivers to determine if a valid version of the database driver requested by the user exists and is appropriately installed on client computer 102. If the driver requested via the user input is found, and if the installation of the driver and the driver's version can be validated, then the core configuration script may end. If, however, the requested driver is not found on client computer 102, if the installation is found to be corrupt or otherwise not in alignment with organizational standards, or if the driver is determined to be an unacceptable version, then the core configuration script file may begin a configuration and installation operation to install the appropriate version of the requested database driver retrieved at step 132. Step 130 may further include configuration of client computer 102 with required database-specific paths, files, and directories for the requested database, database driver, and connection as discussed in more detail herein.

At step 134, a connection validation operation may be prompted for execution on client computer 102. This may be part of, or execution may begin with a command from, a core configuration script file. A connection validation operation may retrieve a database-specific standard query with which to test the connection. A database-specific standard query may be a database query that is created for testing purposes and that is stored in a location from where a connection validation operation may retrieve it, e.g., in an artifact repository 106. A storage location may store a database-specific standard query for each different type of database that a connection validation operation may test, and each database-specific standard query may be formatted in the correct query language and with appropriate parameters such that, if the connection is operative, the query result will validate the operative status of the connection.

A connection validation operation may, if a tested connection is found to be operative, display a message at the interface displayed on client computer 102 indicating success to a user of the client computer. If, on the other hand, the connection is found to be inoperative, the connection validation operation may display a prompt to the user, asking if the user would like a support ticket to be raised. If the user responds to the prompt in the negative, then the connection validation operation and the overarching configuration and installation operation may stop execution. If, however, the user responds in the affirmative to the prompt, then the connection validation operation may proceed to automate creation of a support ticket to technical support platform 110 at step 136.

In accordance with aspects, a connection validation operation may be configured to utilize an application programming interface (API) of technical support platform 110 to raise a support ticket. The connection validation operation may utilize error details from an inoperative database connection attempt (e.g., that utilizes as database driver and configuration freshly installed by an associated configuration and installation operation) as input to an API method call to technical support platform 110. Other method parameters may include an error description, a client computer type and operating system type and version, a database driver version, etc. The method may create the support ticket and may submit the ticket to a queue or other ticket management process for evaluation by a support specialist.

Figure 2:
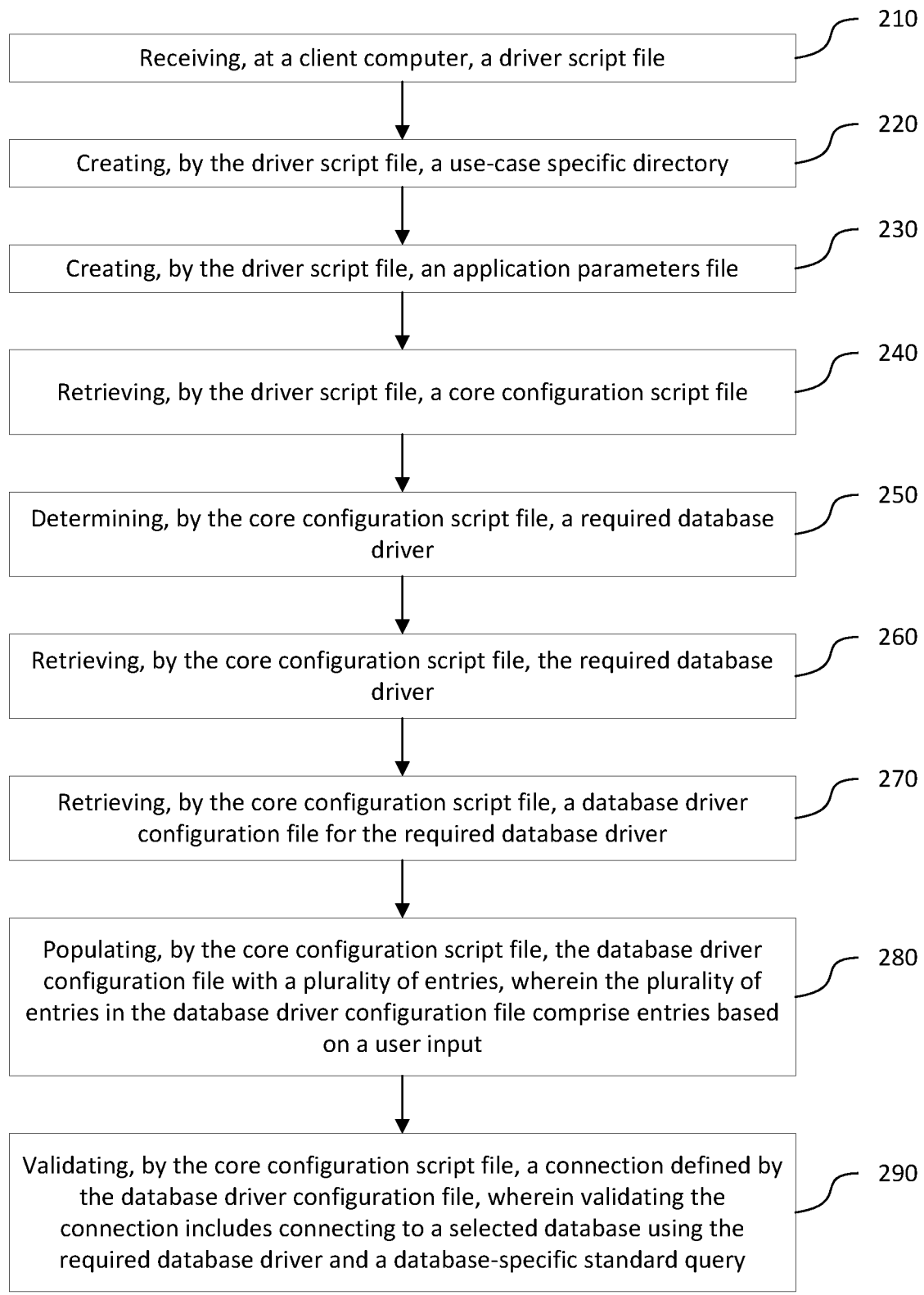
FIG. 2 is a logical flow for providing database driver management, in accordance with aspects.

FIG. 2 is a logical flow for providing database driver management, in accordance with aspects.

Step 210 includes receiving, at a client computer, a driver script file.

Step 220 includes creating, by the driver script file, a use-case specific directory.

Step 230 includes creating, by the driver script file, an application parameters file.

Step 240 includes retrieving, by the driver script file, a core configuration script file.

Step 250 includes determining, by the core configuration script file, a required database driver.

Step 260 includes retrieving, by the core configuration script file, the required database driver.

Step 270 includes retrieving, by the core configuration script file, a database driver configuration file for the required database driver.

Step 280 includes populating, by the core configuration script file, the database driver configuration file with a plurality of entries, wherein the plurality of entries in the database driver configuration file comprise entries based on a user input.

Step 290 includes validating, by the core configuration script file, a connection defined by the database driver configuration file, wherein validating the connection includes connecting to a selected database using the required database driver and a database-specific standard query.

Figure 3:
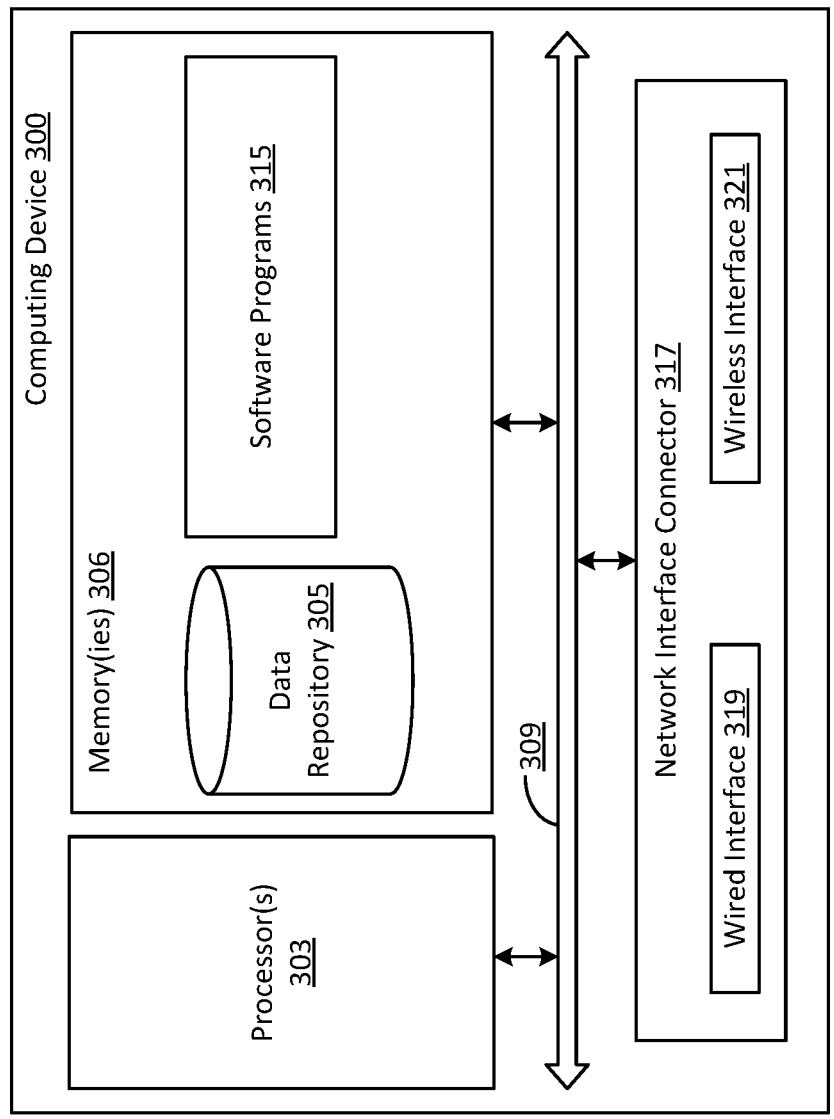
FIG. 3 is a block diagram of a computing device for implementing certain aspects of the present disclosure.

FIG. 3 is a block diagram of a computing device for implementing certain aspects of the present disclosure. FIG. 3 depicts exemplary computing device 300. Computing device 300 may represent hardware that executes the logic that drives the various system components described herein. For example, system components such as a BiD-STM Engine, a ML model engine, an interface, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
   executing, on a client computer, a core configuration script file, wherein the core configuration script file scans the client computer for a required database driver based on a connectivity requirement;
   determining, by the core configuration script file, that the required database driver is not present on the client computer;
   retrieving, by the core configuration script file, the required database driver;
   retrieving, by the core configuration script file, a database driver configuration file for the required database driver;
   populating, by the core configuration script file, the database driver configuration file with a plurality of entries, wherein the plurality of entries in the database driver configuration file comprise entries based on a user input; and
   validating, by the core configuration script file, a connection defined by the database driver configuration file, wherein validating the connection includes connecting to a selected database using the required database driver and a database-specific standard query.

2. The method of claim 1, wherein the user input includes the selected database, and a selected client application to connect to the selected database.

3. The method of claim 1, comprising:
   creating, by the core configuration script file, a database-specific file.

4. The method of claim 1, wherein validating the connection includes creating a connection string based on the plurality of entries in the database driver configuration file.

5. The method of claim 1, comprising:
   determining, by the core configuration script file, that the connection to the selected database is not operative in response to an unsuccessful validation; and
   raising, by the core configuration script file, a support with a technical support platform.

6. The method of claim 1, comprising:
   receiving, at the client computer, a driver script file; and executing the driver script file.

7. The method of claim 6, comprising:
   creating, by the driver script file, a use-case specific directory.

8. The method of claim 7, comprising:
   creating, by the driver script file, an application parameters file.

9. The method of claim 8, comprising:
   retrieving, by the driver script file, the core configuration script file from an artifact repository.

10. The method of claim 6, comprising:
    creating, by the driver script file, a base project directory.

11. A method comprising:
    executing, on a client computer, a core configuration script file, wherein the core configuration script file receives an identification of a required database driver from a first user input and scans the client computer for a required database driver based on a connectivity requirement;
    determining, by the core configuration script file, that the required database driver is not present on the client computer;
    retrieving, by the core configuration script file, the required database driver;
    retrieving, by the core configuration script file, a database driver configuration file for the required database driver;
    populating, by the core configuration script file, the database driver configuration file with a plurality of entries, wherein the plurality of entries in the database driver configuration file comprise entries based on a second user input; and
    validating, by the core configuration script file, a connection defined by the database driver configuration file, wherein validating the connection includes connecting to a selected database using the required database driver and a database-specific standard query.

12. The method of claim 11, wherein the second user input includes the selected database, and a selected client application to connect to the selected database.

13. The method of claim 11, comprising:
    creating, by the core configuration script file, a database-specific file.

14. The method of claim 11, wherein validating the connection includes creating a connection string based on the plurality of entries in the database driver configuration file.

15. The method of claim 11, comprising:
    determining, by the core configuration script file, that the connection to the selected database is not operative in response to an unsuccessful validation; and
    raising, by the core configuration script file, a support with a technical support platform.

16. The method of claim 11, comprising:
    receiving, at the client computer, a driver script file; and executing the driver script file.

17. The method of claim 16, comprising:
    creating, by the driver script file, a use-case specific directory.

18. The method of claim 17, comprising:
    creating, by the driver script file, an application parameters file.

19. The method of claim 18, comprising:
    retrieving, by the driver script file, the core configuration script file from an artifact repository.

20. The method of claim 16, comprising:
creating, by the driver script file, a base project directory.

* * * * *